Sept. 16, 1958 G. J. PETERSON 2,852,049
POWER SAW WITH MEASURING DEVICE
Filed Jan. 24, 1957 3 Sheets-Sheet 1

INVENTOR
Gustaf J. Peterson
By Carlson, Pitzner,
Hubbard & Wolfe
ATTORNEY

Sept. 16, 1958     G. J. PETERSON     2,852,049
POWER SAW WITH MEASURING DEVICE
Filed Jan. 24, 1957     3 Sheets-Sheet 2
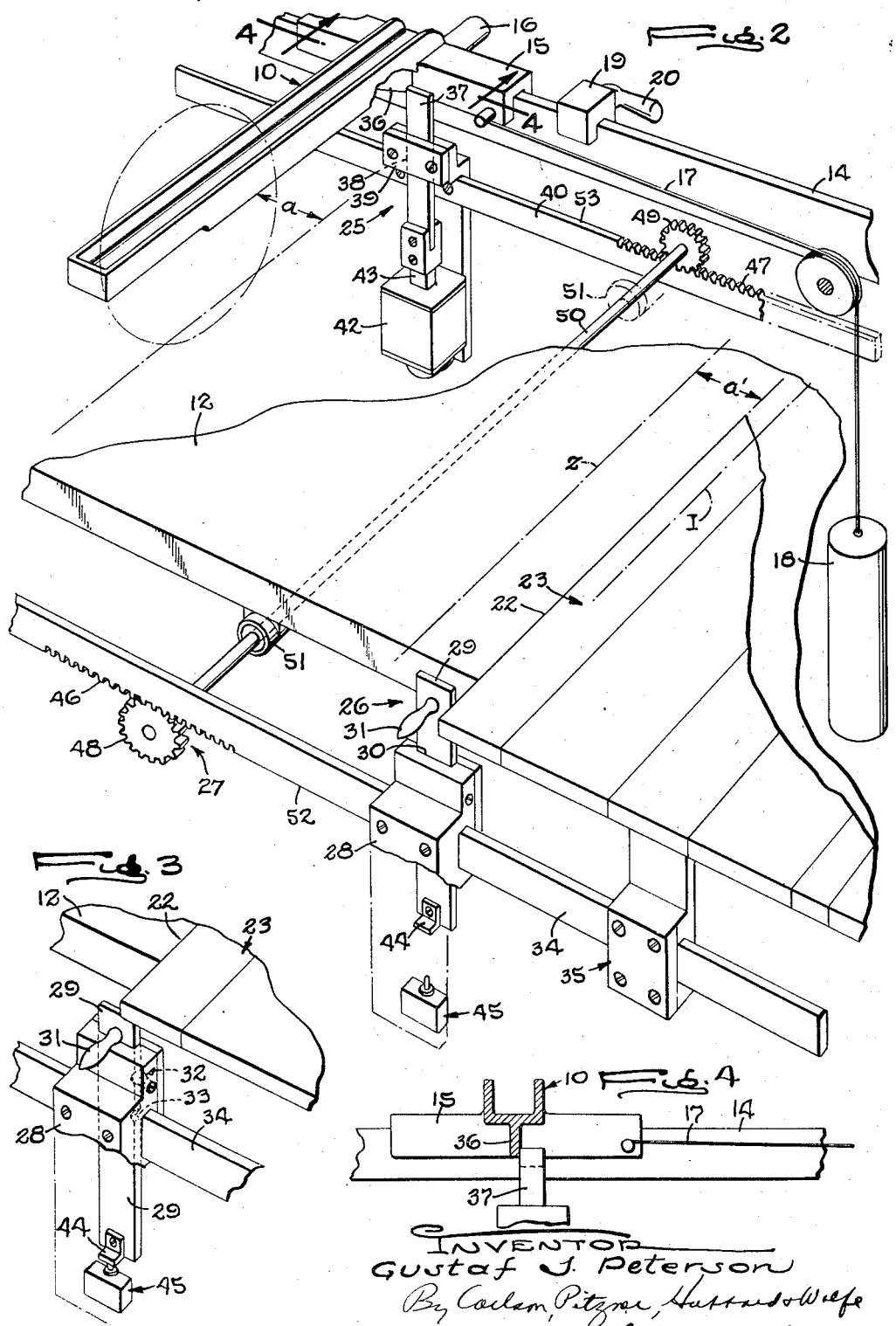
INVENTOR
Gustaf J. Peterson
ATTORNEY Sept. 16, 1958 G. J. PETERSON 2,852,049
POWER SAW WITH MEASURING DEVICE
Filed Jan. 24, 1957 3 Sheets-Sheet 3
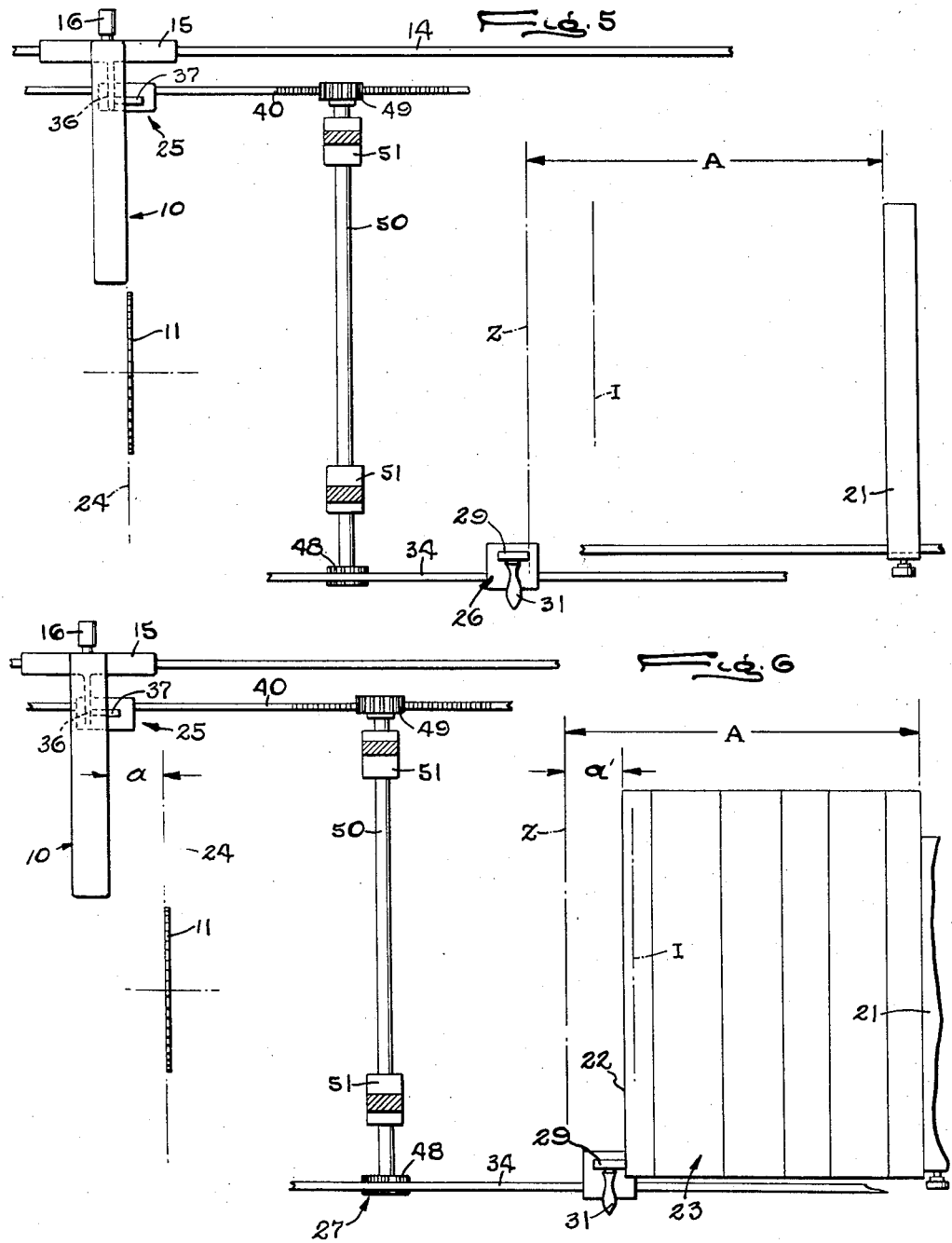
INVENTOR
Gustaf J. Peterson
By Carlson, Pitzner, Hubbard & Wolfe
ATTORNEY United States Patent Office 2,852,049
Patented Sept. 16, 1958

2,852,049

POWER SAW WITH MEASURING DEVICE

Gustaf J. Peterson, Rockford, Ill., assignor to Mattison Machine Works, Rockford, Ill., a corporation of Illinois Application January 24, 1957, Serial No. 636,176

9 Claims. (Cl. 143—176)

This invention relates to a power driven saw, preferably of the so-called circular type, and the manner of its use in cutting a series of boards which, when arranged in edge to edge abutment form a composite panel of a desired width. More particularly, the invention relates to the manner of setting the fence of the saw for cutting the last board to fill out the group to said desired overall width.

The primary object of the invention is to incorporate in a circular saw an improved measuring and gauging mechanism by which the setting of the fence preparatory to cutting the last board of a group may be effected quickly and conveniently without the necessity of making the manual measurements and adjustments heretofore involved in forming a multiple board panel.

A more detailed object is to determine the final setting of the fence by a stop adjustable transversely of the cutting line of the saw in response to movement of a feeler into engagement with the edge of the next to the last board in the group being assembled.

Another object is to couple the feeler and stop together in a novel manner which permits the two to be located at points widely spaced apart along the top of the saw table.

The invention also resides in the novel manner of retracting the feeler and stop out of the way after the gauging operation has been performed.

Other objects and advantages of the invention will become apparent from the following detailed description taken in connection with the accompanying drawings, in which Figure 1 is a fragmentary perspective view of a saw incorporating the novel gauging mechanism of the invention.

Fig. 2 is a fragmentary perspective view of the gauging mechanism showing the relationship of the elements of the gauge.

Fig. 3 is a perspective view showing the feeler of the gauging mechanism in an inactive position.

Fig. 4 is a fragmentary sectional view taken along line 4—4 of Fig. 2 showing the stop of the gauging mechanism in active position.

Fig. 5 is a diagrammatic plan view showing the feeler and stop positioned to locate the fence at the cutting line of a saw.

Fig. 6 is a diagrammatic plan view showing the feeler and stop in another position.

Figure 1:
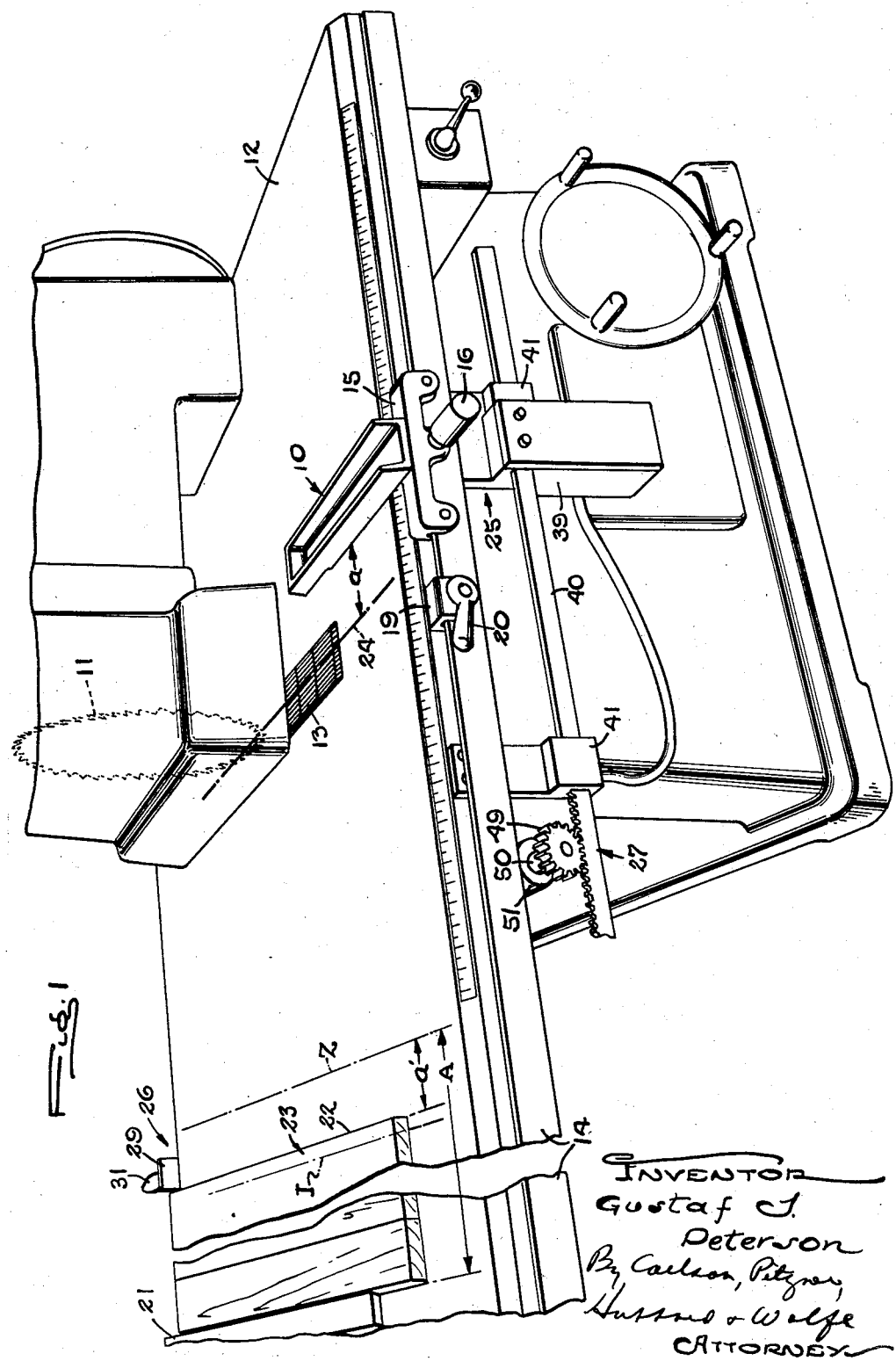

For purposes of illustration, the invention is shown in the drawings incorporated in a power driven saw for cutting boards to selectively variable widths determined by the lateral spacing of a movable fence 10 (Fig. 1) from the plane of a power rotated circular saw 11 upstanding from the top of a table 12 along which a board may be fed to the saw by the usual power driven belt 13. A rail 14 extending along and spaced in front of and below the table supports a guide head 15 of the fence for adjustment toward and away from the plane of the saw, the selected adjustment being retained by tightening a clamping screw 16. Connected to the guide head 15 by a cable 17 (Fig. 2) is a weight 18 (Fig. 2) which yieldably urges the fence toward the saw and to a position determined by a stop 19 held on the rail by a screw clamp 20.

In using a power saw of this character to cut the boards to form a panel such as a veneer core, a stop 21 (Figs. 1, 5 and 6) adjustably mounted at the outer end of the table is clamped to the latter a distance A away from a reference line Z, this distance being equal to the desired overall width of the panel which is formed when the boards are stacked horizontally in edge to edge relation. One operator standing in front of the saw sets the fence for cutting away defects in the edges of the individual boards and guides a board along the fence to the feed belt 13 and the saw. A second operator in back of the saw unloads the sawed boards and arranges them in edge to edge abutment against each other and the stop 21.

When the inner edge of the last board 22 of the incomplete assembly of boards 23 approaches the reference line Z, one of the operators manually measures off the distance $a'$ between this line Z and the board edge. This measurement is used in setting the fence 10 for cutting the last board to fill out the desired width of the panel, and involves a second manual measurement of a distance $a$ between the fence and the plane or line of cut 24 of the saw. Obviously, this procedure is time consuming and likely to result in error in making and transferring the manually made measurements.

The present invention aims to eliminate the necessity of making any manual measurements whatsoever and contemplates locating the fence 10 by a movable stop 25 (Fig. 2) automatically set in the correct position for cutting the last board of the group simply by moving a feeler 26 against the inner edge of the previously cut board 22 of the partial assembly of boards 23 then resting on the table. The feeler 26 and stop 25 are mounted on the table to slide transversely of the plane of cut 24 of the saw but in opposite directions where, as in the present instance, the boards for forming the panel are assembled on the end of the table opposite the fence. Preferably, the motion of the feeler 26 is transmitted to the stop 25 mechanically through a connection 27 (Fig. 2) so arranged in this instance that the feeler may be manipulated by the workman on the unloading or backside of the table.

As may be seen in Fig. 2, the feeler 26 is carried by a block 28 mounted on the table for movement transversely of the plane of the saw. Specifically, the feeler includes a blade 29 guided for vertical movement in ways 30 formed in the block 28, and may be moved by a handle 31 from a lower position below the table top (Fig. 3) to an active position (Fig. 2) for feeling of the innermost board 22. A spring loaded detent 32 (Fig. 3) engageable in a notch 33 in the edge of the blade 29 serves to releasably hold the feeler in raised position.

In the present instance, the feeler 25 is mounted by a block 28 on a horizontally disposed bar 34 positioned on the unloading side of the table. The bar 34 is slidably mounted by brackets 35 spaced from the edge of the table for movement transversely of the plane of the saw thereby enabling the feeler to be moved in the same direction.

In limiting the adjustment of the fence toward the saw preparatory to cutting the last board, the stop 25 is, in the present instance, disposed below the front edge of the table between the latter and the rail 14 and arranged for engagement with a gusset plate 36 (Fig. 4) rigid with and depending from the underside of the fence 10 immediately behind the guide head 15. Herein, the stop comprises a bar 37 guided for vertical movement in ways 38 formed in a block 39. Supporting the block 39 and stop for horizontal movement transversely of the plane of the saw, is a bar 40 spaced from the front edge of the table and slidably mounted on the table by brackets 41 (Fig. 1).

In order to permit the fence to be moved into any position on either side of the saw, the stop bar 37 may be moved in the ways 38 to a lower dotted line position below the path traversed by the gusset plate 36 (Fig. 4). Normally the stop bar 37 is held in a raised or active position above the level of the gusset plate 36 but below the top of the table, when the feeler 26 is in a raised position, by an energized solenoid 42 whose armature 43 is fastened to the lower end of the bar. When the feeler is lowered to its inactive position (Fig. 3), an angle bracket 44 on the blade 29 opens a normally closed switch 45 in the solenoid circuit (not shown) thereby deenergizing the solenoid. Deenergization of the solenoid allows the stop bar 37 to move by gravity to the dotted line position below the gusset plate 36 (Fig. 2). Before the feeler is again raised, it is desirable in all cases, for the operator to move the fence to the right in Fig. 1 so that the stop will not be raised into contact with the underside of the fence or gusset plate.

While the connection 27 for positively transmitting the movements of the feeler 26 to the stop may take various forms to provide the desired wide range of adjustment, it is preferably of the gear type. In the present instance, the connection comprises rack teeth 46 and 47 formed along the bars 34 and 40 and meshing with pinions 48 and 49 on a shaft 50 journaled by bearings 51 on the table. The rack teeth 46 are formed on the underside 52 of the bar 34 and the rack teeth 47 are formed on the upper side 53 of the bar 40 thereby enabling the pinions 48 and 49 and shaft 50 to connect the bars for movement in opposite directions.

The feeler 26 and stop 25 are so arranged on their respective racks 34 and 40 (Fig. 5) that the stop will be positioned to set the fence 10 at the line of cut of the saw 24 when the feeler is positioned with the contact or leading edge of the blade 29 in alinement with the reference or width line Z. The fence is thus positioned for zero cut when the feeler is at a position corresponding to the desired overall width of the panel or group of boards. Then as shown in Fig. 5, if the leading edge of the feeler 26 is moved away from the reference line Z and into abutment with the exposed edge of the nearest board 22 of the assembly or group of boards 23, the stop 25 will move an equal distance in an opposite direction.

In operation, previous to placing cut or trimmed boards on the table, the locator stop 21 is positioned a distance A away from the reference line Z equal to the width of the composite core or panel which is to be formed from the boards. Then with the feeler lowered to the inactive position shown in Fig. 3, the workman on the unloading side of the table may place one or more trimmed or cut boards of random widths on the table against the stop in edge to edge contact paralleling the line of cut 24 and overlapping the unloading edge of the table (Fig. 2).

When it is necessary to cut the last board to go into the core or panel to bring it within the confines of the desired overall width dimension, the workman positions the feeler 26 opposite the reference line Z. At the same time, the saw operator may release the clamping screw 15 and slide the fence 10 to the right in Fig. 1 or away from the saw so that the stop blade 37 will not be moved into abutment with the underside of the gusset plate 36 when the feeler is lifted. The feeler 27 is then lifted to the active position of Fig. 2 thereby closing switch 45 and energizing the solenoid 42 to move the stop bar 32 upwardly to the active position of Fig. 2. After being raised above the table, the feeler 26 is moved to the right in Fig. 2 into abutment with the edge of the board 22 closest to the saw thereby causing the rack 34 to move in the same direction and the rack 40 and stop 25 to move an equal distance in an opposite direction.

The operator then moves the fence 10 to the left in Fig. 1 until the gusset plate 36 abuts the stop bar 37 thereby automatically setting the fence at the exact position necessary to cut the last board to the width a necessary to complete the total width A of the panel. When the width of the group or assembly of boards has been completed, the workman removes the boards and moves the feeler 26 downwardly to the inactive position (Fig. 3) thereby deenergizing solenoid 42 and moving stop 25 downwardly to its inactive position. This enables the saw operator to move the fence manually without restriction by the stop 25 so that the fence may be used in the trimming of boards which will be used to build up a new core or panel.

To inform the operator or workman when to raise the feeler 26 to operating position, a temporary mark or line I may be placed on the table and spaced a short distance from the line Z toward the locator stop 21. Then as the boards are placed on the table in alined relation, one of the boards will eventually cover the mark, indicating to the workman or operator that the next board will probably require cutting to a dimension $a$. The workman may then lift the feeler and prepare to move it into abutment with the edge of the next to last board 22.

While the feeler has been shown mounted on the unloading or opposite side of the table from the fence, it will be apparent that it might also be mounted on the loading side of the table using the same relative arrangement of racks and pinions. Or, the table area behind and to the right of the saw shown in Fig. 1 may be extended, and the feeler mounted on the opposite side of the table from the fence but on the same side of the plane of the saw. In this case, the feeler and fence would move in the same direction instead of in opposite directions as in the preferred embodiment illustrated in the drawings. Additionally, while the feeler and stop have been shown to be guided for vertical linear motion, they may also be pivotally mounted and still remain within the realm of the invention.

I claim as my invention:

1. In a power saw, the combination of, a table, a saw upstanding through the table top in a vertical cutting plane, a fence paralleling said plane and mounted on said table for adjustment across said top laterally of said plane, said table top providing on the side of said plane opposite said fence an area for supporting a series of sawed boards edge to edge and paralleling said plane, a feeler mounted on said table for movement transversely of said plane into feeling engagement with the inner exposed edge of the board of said series nearest said plane, a stop adapted to limit the adjustment of said fence toward said plane and mounted on said table for adjustment transversely of the plane, and means coupling said stop and feeler together for movement in unison but in opposite directions.

2. In a power saw, the combination, of a table, a saw upstanding through the table top in a vertical cutting plane, a fence paralleling said plane and mounted on said table above said table top for adjustment laterally of said plane, said table top providing an area spaced from said saw for supporting a series of said boards edge to edge and paralleling said plane, a feeler mounted on said table for movement transversely of said plane into feeling engagement with an exposed edge of one of said boards which parallels said plane, a stop for limiting the adjustment of said fence toward said plane mounted on said table for adjustment transversely of the plane, and means coupling said stop and feeler together for movement in unison.

3. In a power saw, the combination of, a table, a saw upstanding through the table top in a vertical cutting plane, a fence paralleling said plane and mounted on said table for adjustment laterally of said plane across said top, said table top providing an area spaced from said saw for supporting a series of said boards edge to edge and paralleling said plane, a feeler mounted on one side of said table for movement transversely of said plane into feeling engagement with the inner edge of the innermost one of said boards, a stop for limiting the adjustment of said fence toward said plane mounted on an opposite side of said table from said feeler for adjustment transversely of the plane, and means coupling said stop and feeler together for movement in unison.

4. In a power saw, the combination of, a table, a saw upstanding through the table top in a vertical cutting plane, a fence paralleling said plane and mounted on said table for adjustment laterally of said plane, said table top providing an area spaced from said saw for supporting a series of said boards edge to edge and paralleling said plane, a first bar slidably mounted on said table for movement transversely of said plane, a feeler mounted on said bar and adapted to be moved into feeling engagement with an exposed edge of one of said boards which parallels said plane, a second bar slidably mounted on said table for movement transversely of said plane, a stop for limiting the adjustment of said fence toward said plane mounted on said second bar, and means coupling said first and second bars together for movement in unison to move said feeler and stop transversely of said plane.

5. In combination with a power saw having a table, a rotary saw, and a fence adjustable along the table top to guide a board to the saw, horizontal bars, guides supporting said bars in front and back of said table for endwise movement transversely of the plane of said saw, a motion reversing mechanical connection between said bars, a feeler upstanding from one of said bars and movable therewith into abutment with the inner edge of a group of boards stacked together edge to edge on one end of said table, and a stop upstanding from the other of said bars and adapted for abutment with said fence, said stop, when said feeler is engaging said inner edge, serving to gauge the adjustment of said fence for cutting a board to a width for filling the stack out to a predetermined overall width.

6. In a power saw, the combination of, a table, a saw upstanding through the table top in a vertical cutting plane, a fence paralleling said plane and mounted on said table above said table top for adjustment laterally of said plane, said table top providing an area spaced from said saw for supporting a series of said boards edge to edge and paralleling said plane, a retractable feeler mounted on said table for movement transversely of said plane into feeling engagement with an exposed edge of one of said boards which parallels said plane, a retractable stop for limiting the adjustment of said fence toward said plane and mounted on said table for adjustment transversely of the plane, and means coupling said stop and feeler together for movement in unison.

7. In a power saw, the combination of, a table, a saw upstanding through the table top in a vertical cutting plane, a fence paralleling said plane and mounted on said table above said table top for adjustment laterally of said plane, said table top providing an area for supporting a series of said boards edge to edge and paralleling said plane, a retractable feeler mounted on said table for movement transversely of said plane into feeling engagment with an exposed edge of one of said boards which parallels said plane, a stop mounted for retraction in response to retraction of said feeler for limiting the adjustment of said fence toward said plane and mounted on said table for adjustment transversely of the plane, and means coupling said stop and feeler together for movement in unison.

8. In a power saw, the combination of, a table, a saw upstanding through the table top in a vertical cutting plane, a fence paralleling said plane and mounted on said table above said table top for adjustment laterally of said plane, said table top providing an area for supporting a series of said boards edge to edge and paralleling said plane, a feeler mounted on said table for movement transversely of said plane into feeling engagement with an exposed edge of one of said boards which parallels said plane, said feeler also being mounted for retractable movement from a lower to raised position, a stop for limiting the adjustment of said fence toward said plane mounted on said table for adjustment transversely of the plane, a solenoid connected to said stop for moving said stop from a lower to a raised position actuated in response to raising or lowering of said feeler, and means coupling said stop and feeler together for movement in unison.

9. In combination with a power saw having a table, a rotary saw, and a fence adjustable along the table top to guide a board to the saw, horizontal rack bars, guides supporting said bars in front and back of said table for endwise movement transversely of the plane of said saw, interconnected pinions meshing with the teeth of said rack bars, a feeler upstanding from one of said bars and movable therewith into abutment with the inner edge of a group of boards stacked together edge to edge on one end of said table, and a stop upstanding from the other of said bars and adapted for abutment with said fence, said stop, when said feeler is engaging said inner edge, serving to gauge the adjustment of said fence for cutting a board to a width for filling the stack out to a predetermined overall width.

References Cited in the file of this patent

UNITED STATES PATENTS

| | | |
|---|---|---|
| 1,686,246 | Murner | Oct. 2, 1928 |
| 2,166,703 | Boice | July 18, 1939 |
| 2,267,937 | Mattison | Dec. 30, 1941 |
| 2,523,834 | Lawson | Sept. 26, 1950 |
| 2,714,906 | Peterson | Aug. 9, 1955 |